United States Patent [19]

Utsler

[11] 4,117,618
[45] Oct. 3, 1978

[54] FISHING POLE WITH SPACED ILLUMINATING MEANS

[76] Inventor: Charles S. Utsler, Rte. 1, Hackensack, Minn. 56452

[21] Appl. No.: 765,386

[22] Filed: Feb. 3, 1977

[51] Int. Cl.² .............................................. A01K 87/00
[52] U.S. Cl. .......................................... 43/17.5; 43/24
[58] Field of Search ................ 43/17.5, 18 R, 18 GF, 43/17.6, 24; 362/32, 102, 120, 217, 800

[56] References Cited

U.S. PATENT DOCUMENTS

| | | | |
|---|---|---|---|
| 3,017,499 | 1/1962 | Fore | 43/17.5 X |
| 3,535,018 | 10/1970 | Vasilatos | 43/17.5 X |
| 3,678,590 | 7/1972 | Hayward | 43/17.5 X |
| 3,934,105 | 1/1976 | Lockard | 43/17.5 X |
| 3,940,868 | 3/1976 | Northcutt | 43/17.6 |
| 3,943,815 | 3/1976 | Gilbert | 43/17.5 X |
| 4,026,059 | 5/1977 | Ochs | 43/17.5 |

*Primary Examiner*—Ronald E. Suter
*Attorney, Agent, or Firm*—Warren A. Sturm; Hugh D. Jaeger

[57] ABSTRACT

Fishing pole having an energy source located in a handle of the fishing pole and a light bulb internal to the handle connected to the energy source. A strand of optical fiber is located in a rod of the pole with scrapes at various intervals or a plurality of fibers is located in the rod to transmit light energy from the light source to various portions of the pole so that the pole is illuminated. The rod of the pole may also be illuminated with light emitting diodes embedded in the pole and placed at a tip of the pole connected to wires which run the distance of the pole. The rod would plug into the energy source of the handle to energize the light emitting diodes.

2 Claims, 5 Drawing Figures

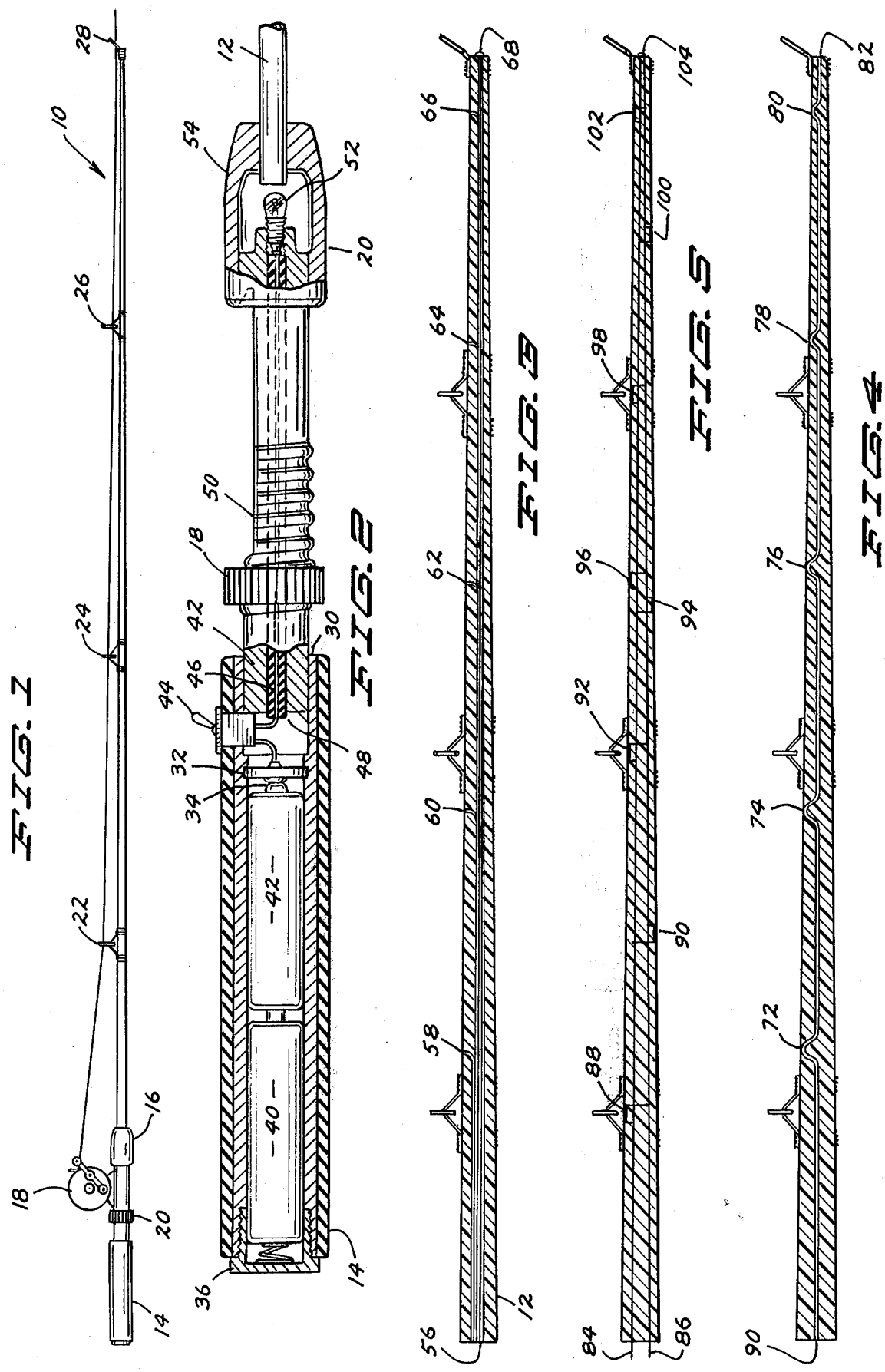

FISHING POLE WITH SPACED ILLUMINATING MEANS

BACKGROUND OF THE INVENTION

1. Field of the Invention

This invention relates generally to a fishing pole, and more particularly, pertains to an illuminated fishing pole wherein the rod of the fishing pole is illuminated by either light emitting diodes or optical fibers energized from an energy source or light source respectively in the handle of the fishing pole.

2. Description of the Prior Art

In the field of fishing poles, it has been a general practice to use non-illuminated fishing poles while fishing at night. Such fishing poles have been unsatisfactory in that the fisherman is unable to see his pole in the night while fishing. Further, if a fisherman is using a number of poles or if a fisherman is fishing in a group, it is generally well recognized that fishing poles and lines will subsequently become tangled in the darkness of night as the fisherman is unable to see the locations of the poles.

U.S. Pat. Nos. 3,017,499 and 3,862,509 disclose prior art fishing poles wherein the entire rod is illuminated.

This invention provides an illuminated fishing pole wherein selective portions of the rod are illuminated.

SUMMARY OF THE INVENTION

The present invention obviates the foregoing disadvantages of the prior art fishing poles by providing an illuminating fishing pole. An energy source in the handle of the fishing pole illuminates the rod portion of the fishing pole.

According to one embodiment of the present invention, there is provided a fishing pole having a rod attached to a handle which contains the energy source. One embodiment of the invention is a rod with wires embedded in the rod or attached thereto having light emitted diodes embedded in the rod attached to the wires, or attached to the rod and attached to the wires. The light emitting diodes may be spaced at any desired spacing along the rod and further, a light emitting diode may be affixed to the end of the rod. Any desired shape of light emitting diodes may be used. Another embodiment of the invention is a rod having an optical fiber throughout its length and scraped at various distances along the length of the rod to provide illumination, or a cluster of optical fibers contained within the rod and positioned to illuminate portions of the rod including the end of the rod. A flashlight bulb would be affixed internal to the handle of the rod containing the energy source to provide illumination for the optical fibers.

A significant aspect and feature of the present invention is a selective illuminated rod of a fishing pole enabling a fisherman to observe his pole at night without the aid of other artificial illumination.

Having briefly described one embodiment of the present invention, it is a principal object thereof to provide a new and improved illuminated fishing pole.

An object of the present invention is the provision of a fishing pole which has illumination devices on or in the rod and energized by an energy source in the handle of the fishing pole.

Another object of the invention is the provision of the illuminated fishing pole to allow a fisherman to observe his pole at night without the aid of other artificial light or illumination providing a certain safety factor.

Still another object of the invention is the provision of a fishing pole which is illuminated and appears as any other rod in use today with no bulk or lessening of effectiveness of one's fishing abilities. The pole is not only limited to use during the night in darkness but is also intended for use during the day and is to be included as basic equipment in one's regular collection of fishing tackle and gear.

A further object of the invention is the illumination of the fishing pole by either light emitting diodes contained on or embedded in the fishing pole, or optical fiber or fibers contained within the fishing pole and lighted through a light bulb contained within the energy source in the handle. These illumination devices add no extra weight nor do they affect the elasticity of the fishing pole whether it be fiberglass or any other suitable material providing the proper elasticity action.

An additional object of the invention is depending upon the material of the fishing pole such as fiberglass. The illumination devices further cause the emitted light to illuminate the back side portion of the fishing pole.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designated like parts through out the figures thereof and where:

FIG. 1 illustrates a fishing pole;

FIG. 2 illustrates a cross-sectional view of the handle of the fishing pole;

FIG. 3 illustrates an embodiment of the rod of the fishing pole of FIG. 1;

FIG. 4 illustrates another embodiment of the rod of the fishing pole of FIG. 1; and FIG. 5 illustrates another embodiment of the rod of the fishing pole of FIG. 1.

DESCRIPTION OF THE PREFERRED EMBODIMENTS

FIG. 1, which illustrates a preferred embodiment of the invention, shows a fishing pole 10 having a rod 12 which attaches to a handle 14 with a rod plug 16. A reel 18 attaches to the handle 14 with a nut 20. Guides 22, 24, 26 and 28 tip are affixed to the rod 12 of fishing pole 10 in the usual customary manners well known in the art.

FIG. 2 shows a cross-sectional view of the handle 14 of the fishing pole 10 of FIG. 1 illustrating internal energy housing 30 contained within handle 14 having a frontplate 32, a battery pin 34, and a backplate butt cap 36 having an internal spring 38 to retain batteries 40 and 42. The frontplate 32 is suitably secured within the internal energy housing 30 and the backplate butt cap 32 is threaded to receive threads of the internal energy housing 30 to be removable from the housing 30 but yet watertight to permit replacement of the batteries 40 and 42. Switch 44 connects between wire 46 contained within insulator 48 running through the length of reel support 50 of handle 14 to light bulb 52 which is contained within light chamber of the handle 14 and the battery pin 34 of battery plate 36. The switch 44 may also be located in the rear of the handle such as in the butt cap. Rod 12 snuggly fits into the light chamber 54 either by a force fit or by threads which are not shown between the light chamber 54 and the rod 12.

FIG. 3 illustrates a preferred embodiment of the invention showing a cluster of optical fibers 56 at the larger diameter end of rod 12 having outputs of optical fibers 58, 60, 62, 64, 66, and 68 which protrude at the smaller diameter end of rod 12 of the tip 28 to selectively illuminate the rod 12, the number of fiber optics is not to be construed as limiting the inventive disclosure.

FIG. 4 shows another embodiment of the invention showing an optical fiber 70 running the continuous length of the rod 12 embedded therein while being looped and scraped at areas 72, 74, 76, 78, and 80 to protrude at the smaller diameter end 82 of rod 12 of the tip 28 to selectively illuminate the rod 12.

FIG. 5 illustrates another embodiment of the invention showing rod 12 with wires 84 and 86 embedded in the rod throughout the entire length of the rod. Light emitting diodes 88, 90, 92, 94, and 96, 98, 100, 102 and 104 are either embedded into the rod 12 or affixed thereon with any suitable fastening material such as epoxy cement. The number of light emitting diodes is not to be construed as limiting the inventive disclosure. All the diodes electrically connect to the wires 84 and 86 by any well known method such as soldering, welding, etc. The diodes 88-104 may either be flat rectangular diodes and diode 104 is the half hemispherical diode.

Light emitting diodes 88, 92, and 96 are positioned under the guides 22, 24, and 26 respectively and depending upon the type of tip 28, may also be placed under the tip 28 to selectively illuminate the rod 12. Light chamber 54 may be provided with a suitable type of plug to accept the rod 12 to permit electrical connection of energy between the internal energy source 30 contained within handle 14 and wires 84 and 86 of the rod 12 of FIG. 5.

PREFERRED MODE OF OPERATION

The fishing pole 10 of the disclosed invention is used as any other normal fishing pole would be used by a fisherman. A fisherman only need decide whether he will be using the fiber optic pole of FIGS. 3 and 4 which is illuminated by light bulb 52 within light chamber 54 or the light emitting diode pole of FIG. 5 which is supplied with energy through suitable connections of wires 84 and 86 connecting the rod 12 to the energy source 30 contained within handle 14 through any well known electrical connection means.

A fisherman in using the fishing pole 10 inserts batteries 40 and 42 into the internal energy housing 30 by unscrewing backplate butt cap 36, inserting batteries 40 and 42, and screwing the backplate 36 back into the internal energy source 30 contained within handle 14. Switch 44 supplys energy to light bulb 52 to illuminate selective portion of the rod 12 through the fiber optics of FIGS. 3 and 4 or to wires 84 and 86 provided through a suitable electrical connection to energize the light emitting diodes of FIG. 5. When a fisherman wishes to change a rod, it is only necessary to unplug the rod 12 from the light chamber 54 or unscrew the rod 12 from the light chamber 54 depending upon what type of mechanical connection is provided. Switch 44 controls the electrical energy to either illuminate bulb 52 for the transmission of light energy to the fiber optic rods of FIGS. 3 and 4 or to provide electrical energy to wires 84 and 86 to illuminate the light emitting diode rod of FIG. 5.

Various modifications are contemplated and may obviously be resorted to by those skilled in the art without departing from the parent scope of the invention as hereinafter defined by the appended claims and only preferred embodiment thereof have been disclosed. Any number of fiber optics may be used in the fiber optic rod 12 of FIG. 3 and may be positioned to illuminate at any desired location on the rod 12. The fiber optic rod 12 of FIG. 4 and may have the fiber optic 70 positioned in any particular manner and should not be limited or construed to the particular shape as shown. The handle 14 may be one continuous handle containing the fiber optic 70 which may be positioned on the outside of the rod, but internal to the handle 14 of the fishing pole 10 to loop into the rear of the handle. Also, in lieu of using a fiber optic, one may utilize a light ribbon, a cluster group of fiber optics to illuminate the fishing pole. The light emitting diode rod 12 of FIG. 5 may consist of any number of light emitting diodes, whether the light emitting diodes be small rectangular diodes or the half hemispherical diodes, and may be placed or clustered as one may so particularly desire to achieve a illuminated effect most advantageous to fishing. Also, the particular shape of the cross-sectional view of handle 14 as shown in FIG. 2 is not to be construed as limiting as the only way of providing illumination to the fiber optic rods of FIG. 3 and 4 or for providing electrical energy of the light emitting diode rod of FIG. 5. Further, the rod 12 may break down into sections for storage provided that suitable connecting means are provided. The invention is for use on any type of fishing pole 10, fiberglass, graphite, bamboo, or otherwise.

Als, electrical circuitry may be provided to vary the intensity of the lamp illuminating the fiber optics or light emitting diodes. Further, electrical circuitry may be provided to flash the illumination off and on.

Having thus described the invention, there is claimed as new and desired to be secured by Letters Patent:

1. A fishing pole comprising a handle; a length of rod attached to one end of said handle; an energy means contained within said handle; a push button switch contained within an other end of said handle and having one contact connected to one side of said energy source; a pair of electrical wires disposed within said rod and connected to an other side of said energy source and an other contact of said switch, and; a plurality of at least three light emitting diodes disposed internal to the length of said rod, distributed along the length of said hollow rod and connected across said pair of electrical wires whereby said light emitting diodes selectively illuminate lengthwise spaced portions of said hollow rod.

2. The fishing pole of claim 1 wherein said plurality of diodes comprise at least five diodes equally distributed along the length of said rod.

* * * * *